(12) United States Patent
Hanya et al.

(10) Patent No.: US 7,889,460 B2
(45) Date of Patent: Feb. 15, 2011

(54) SLIDER SUPPORTING APPARATUS INCLUDING A FLEXURE HAVING SPRING CHARACTERISTICS AND MANUFACTURING METHOD THEREFOR

(75) Inventors: Masao Hanya, Yokohama (JP); Toshiki Ando, Yokohama (JP); Takumi Karasawa, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 900 days.

(21) Appl. No.: 11/799,195

(22) Filed: May 1, 2007

(65) Prior Publication Data
US 2007/0263325 A1 Nov. 15, 2007

(30) Foreign Application Priority Data
May 10, 2006 (JP) ............................. 2006-131721

(51) Int. Cl.
*G11B 5/48* (2006.01)
(52) U.S. Cl. .................................. 360/245.3
(58) Field of Classification Search ............. 360/245, 360/245.3
See application file for complete search history.

(56) References Cited

U.S. PATENT DOCUMENTS 6,549,375 B1 * 4/2003 Crane et al. ............... 360/245.3
2006/0236527 A1 10/2006 Davis et al.

FOREIGN PATENT DOCUMENTS

JP 2004-86976 A 3/2004
JP 2005-322377 A 11/2005

* cited by examiner

*Primary Examiner*—David D Davis
(74) *Attorney, Agent, or Firm*—Holtz, Holtz, Goodman & Chick, PC

(57) ABSTRACT

A slider supporting apparatus is provided with a flexure formed of a metal plate having spring characteristics. The flexure comprises a gimbals portion including a tongue, a first support portion which supports one longitudinal end of a slider, a second support portion which supports the other end of the slider, and a spring portion composed of a pair of flat springs. Convexes and concaves of each flat spring are alternately formed along a surface direction of the flexure by etching. The flat springs extend to a length which allows the slider to be inserted between the support portions when subjected to a tensile load, and contract to a length such that the slider can be held between the support portions when subjected to no tensile load.

17 Claims, 6 Drawing Sheets

SLIDER SUPPORTING APPARATUS INCLUDING A FLEXURE HAVING SPRING CHARACTERISTICS AND MANUFACTURING METHOD THEREFOR

CROSS-REFERENCE TO RELATED APPLICATIONS

This application is based upon and claims the benefit of priority from prior Japanese Patent Application No. 2006-131721, filed May 10, 2006, the entire contents of which are incorporated herein by reference.

BACKGROUND OF THE INVENTION

1. Field of the Invention

This invention relates to a slider supporting apparatus for supporting a slider of a hard disc drive used in an information processing apparatus, such as a personal computer, and a manufacturing method therefor.

2. Description of the Related Art

A disc drive suspension provided with a magnetic head is used to write and read data to and from a magnetic disc for use as a recording medium. A hard disc drive (HDD) 1 shown in FIG. 9, for example, comprises discs 2 for use as recording media, disc drive suspensions (hereinafter referred to simply as suspensions) 3, an arm (actuator arm) 4 on which the suspensions 3 are mounted, etc. A slider 5 that constitutes a magnetic head is mounted on the distal end of each suspension 3. Each suspension 3 is provided with a base plate 6 fixed to the arm 4, a load beam 7, a flexure 8, a hinge member 9 of a spring material, etc. If the disc 2 rotates, the slider 5 is caused to fly slightly above it by air that flows between the disc 2 and the slider 5.

Conventionally, sliders are mounted on suspensions as they are checked for read/write characteristics, flying characteristics, etc., by using a slider tester for determining the conformity of the sliders. Those sliders which are concluded to be non-defective as a result of the checks are incorporated together with the suspensions into an actual disc drive. Those ones which are judged to be defective are rejected together with the suspensions. If a slider is rejected as defective, therefore, its suspension will be needlessly rejected, resulting in an increase in cost. Possibly, defective sliders may be removed from their suspensions so that the suspensions can be reused. However, this operation is troublesome and may damage the suspensions, in some cases.

Accordingly, there have been developed slider testers that can inspect each individual slider. In a conventional slider tester described in Jpn. Pat. Appln. KOKAI Publication No. 2004-86976, for example, sliders are supported so as to share the same conditions with actual suspensions. A recording medium as a magnetic disc is rotated to lift the sliders, and the read/write characteristics, flying characteristics, etc., of the sliders are measured in this state. Use of this tester is advantageous in cost, since it requires disposal of only those sliders which are judged to be rejectable. This slider tester, however, is only a simulation of a suspension. Therefore, a load applied to the sliders and the stiffness of a gimbals portion can be made only limitedly similar to those for actual suspensions.

Accordingly, there have been developed slider supporting apparatuses that have a load beam, flexure, etc., constructed in the same manner as those of actual suspensions and can be removably fitted with a slider. One such slider supporting apparatus is described in Jpn. Pat. Appln. KOKAI Publication No. 2005-322377 and US 2006/0236527 A1, for example. As shown in FIG. 10, this conventional slider supporting apparatus comprises a gimbals portion 12 including a tongue 11, a pair of bellows portions 13 as springs, a first support portion 14, a second support portion 15, etc., which constitute a part of a flexure 10.

Each bellows portion 13 has tops and bottoms that are formed by plastic working. It can be formed by corrugating a part of the flexure 10 in its thickness direction like waves. The slider 5 (indicated by a two-dot chain line) is placed on the tongue 11 with the bellows portions 13 stretched in the direction of arrow T by means of a jig. Thereafter, the bellows portions 13 are released from a tension, whereupon the slider 5 is clamped between the support portions 14 and 15. When the disc in the slider tester is rotated at high speed with respect to the slider 5, the slider 5 flies above the disc. Various checks are performed in this state. After the checks are finished, the slider 5 is removed from between the support portions 14 and 15 by stretching the bellows portions 13 with the jig. Those sliders which are judged to be unacceptable by the checks are abandoned.

The tops and the bottoms of the bellows portions 13 shown in FIG. 10 are formed by plastic working such that the flexure 10 is bent in its thickness direction. Accordingly, the number of tops and bottoms and the height of the tops can be increased only limitedly within the restricted range of length of the gimbals portion 12. It is difficult, therefore, to lower the spring constant of the bellows portions 13, and the stroke for extension and contraction is short. Thus, the distance between the support portions 14 and 15 cannot be made long enough in setting the slider 5 on the tongue, so that there is a possibility of the slider 5 interfering with the support portions 14 and 15. Depending on the shape of the bellows portions 13, moreover, a moment may be generated such that the rear end of the slider 5 is lifted in the direction (pitch direction) indicated by arrow R. Possibly, therefore, the pitch static attitude (PSA) of the gimbals portion 12 may change. In this case, conditions for the slider 5 are inevitably different from those for actual suspensions.

BRIEF SUMMARY OF THE INVENTION

The object of this invention is to provide a slider supporting apparatus in which the spring constant of a spring portion of a gimbals for removably holding a slider can be lowered to lengthen the stroke of the spring portion.

This invention is a slider supporting apparatus provided with a flexure formed of a metal plate having spring characteristics, the flexure comprising a gimbals portion including a tongue on which a slider is mounted, a first support portion which supports one longitudinal end of the slider placed on the tongue, a second support portion which is movable with respect to the first support portion in a longitudinal direction of the slider and supports the other end of the slider, and a spring portion which urges the second support portion toward the first support portion. The spring portion is composed of a pair of flat springs each including a plurality of convexes and concaves alternately formed along the opposite sides of the tongue along a surface direction of the flexure, and is configured to extend to a length which allows the slider to be inserted between the first and second support portions when subjected to a tensile load and to contract to a length such that the slider is held between the first and second support portions when subjected to no tensile load.

In the slider supporting apparatus provided with the flexure for removably holding the slider, according to the invention, the spring constant of the spring portion formed on a part of the flexure can be lowered to obtain a long extension stroke. Thus, the distance between the first and second support portions can be made long enough to avoid interference between the slider and the support portions as the slider is put onto the tongue.

Unlike the case of conventional bellows portions (in which tops and bottoms of wave-like corrugations are alternately formed by bending a flexure), moreover, PSA changes can be suppressed when the slider is clamped between the first and second support portions.

In a preferred aspect of the invention, each of the flat springs is shaped so that a middle part between each convex and each corresponding concave is narrow and that the width thereof increases from the middle part toward respective extremities of the convex and the concave. According to this arrangement, the spring constant can be further lowered, since stresses on various parts of the flat springs are equalized. In order to achieve the same object, each of the flat springs has a middle part with a fixed width between each convex and each corresponding concave such that a width of respective extremities of the convex and the concave is greater than a width of the middle part.

For example, the flexure has a pair of outrigger portions formed along the flat springs on the opposite side portions of the flexure, first slits formed between the flat springs and the outrigger portions by etching, second slits formed between the flat springs and the tongue by etching, and a third slit formed between the tongue and the second support portion. Thus, in this configuration, the flat springs are formed by etching.

The flexure may be provided with a conductive circuit portion having a distal end portion which electrically connects with a terminal area of the slider when the slider is held between the first and second support portions, the distal end portion doubling as the first support portion.

Further, the slider supporting apparatus of the invention may comprise a base portion fixed to a tester for checking the slider, a load beam mounted on the base portion for displacement in a thickness direction thereof by a hinge member having spring characteristics, and the flexure located overlapping the load beam and provided with the gimbals portion on a distal end portion of the load beam. According to this arrangement, the slider can be checked under the same conditions for disc drive suspensions that use sliders.

If the contours of the flat springs and the gimbals portion are formed by etching the metal plate which constitutes the flexure, the slider supporting apparatus that has the flat springs with a complicated precise shape can be formed more easily and accurately than an apparatus that is formed by machining such as precision pressing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of this invention will now be described with reference to FIGS. 1 to 5.

Figure 1:
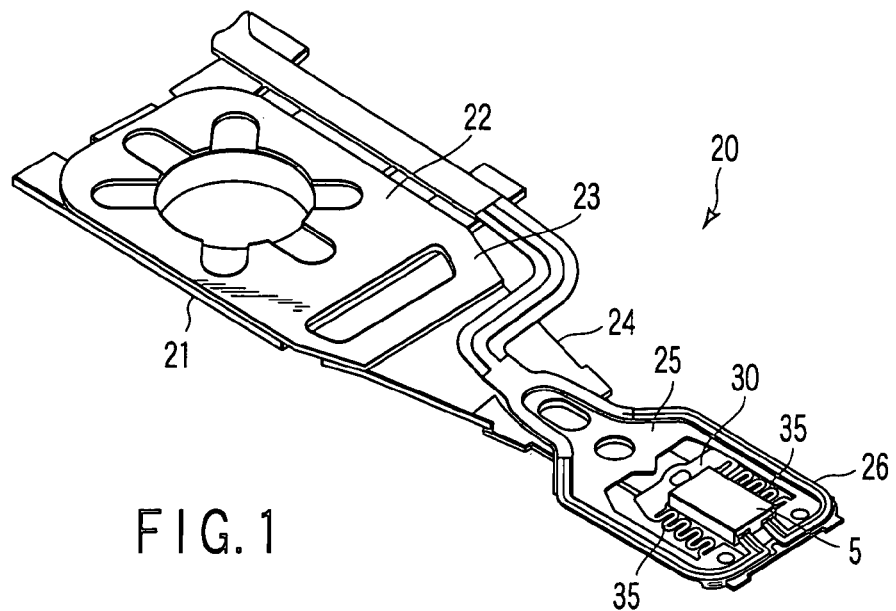
FIG. 1 is a perspective view of a slider supporting apparatus according to a first embodiment of the invention.

A slider supporting apparatus 20 shown in FIG. 1 is applicable to a slider tester (not shown) for testing the slider 5. The slider 5 is used in a hard disc drive (HDD). The slider tester comprises a disc for use as a recording medium, a drive mechanism for rotating the disc at high speed, and a measuring section for checking the slider 5 for flying characteristics, read/write characteristics, etc. The slider tester is configured so that the slider 5 can be caused to fly above the disc as the disc is rotated at high speed.

Figure 9:
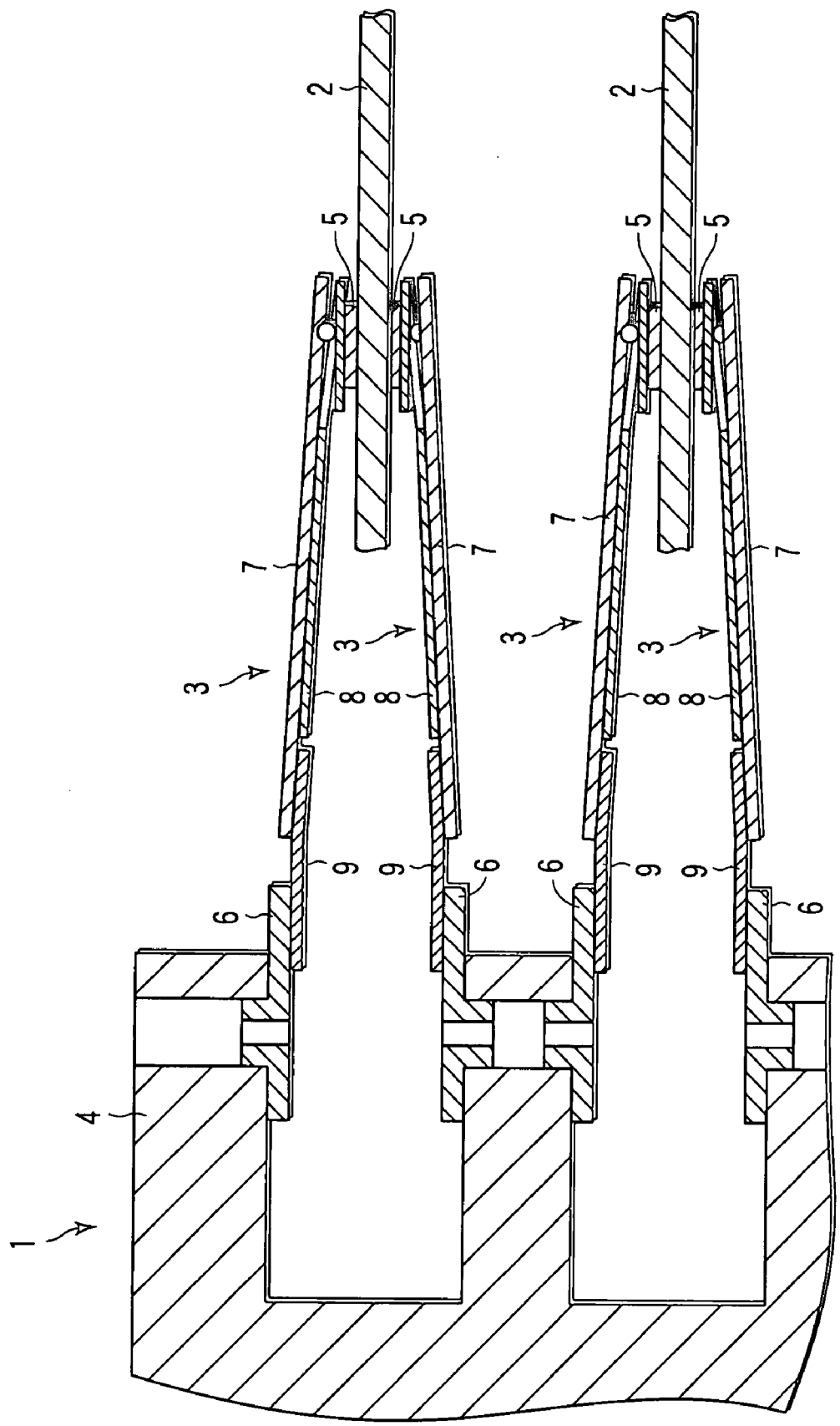
FIG. 9 is a sectional view showing an example of a disc drive.

The slider supporting apparatus 20 shown in FIG. 1, like the disc drive suspension 3 shown in FIG. 9, comprises a base portion 22 with a base plate 21, a hinge member 23 fixed to the base plate 21, a load beam 24, a flexure 25, etc. A proximal portion of the load beam 24 is fixed to an end portion of the hinge member 23. The flexure 25 is located overlapping the load beam 24. The base portion 22 is fixed to a work support portion of the slider tester.

The thickness of the load beam 24 ranges from about 25 to 100 μm, for example. The thickness of the base plate 21 is generally larger than that of the load beam 24 and ranges from about 150 to 200 μm, for example. The thickness of the hinge member 23 is smaller than that of the load beam 24 and ranges from about 25 to 40 μm, for example. The hinge member 23 has spring characteristics and is elastically bendable in its thickness direction.

The flexure 25 is located overlapping the obverse or reverse surface of the load beam 24 on which the hinge member 23 is provided. The flexure 25 is formed of a springy metal plate such as a stainless steel plate. This metal plate is generally thinner than the hinge member 23 and has a thickness of about 15 to 25 μm, for example. A conductive circuit portion 26 is formed along a part of the metal plate. Thus, the flexure 25 is a flexure with conductors.

Figure 2:
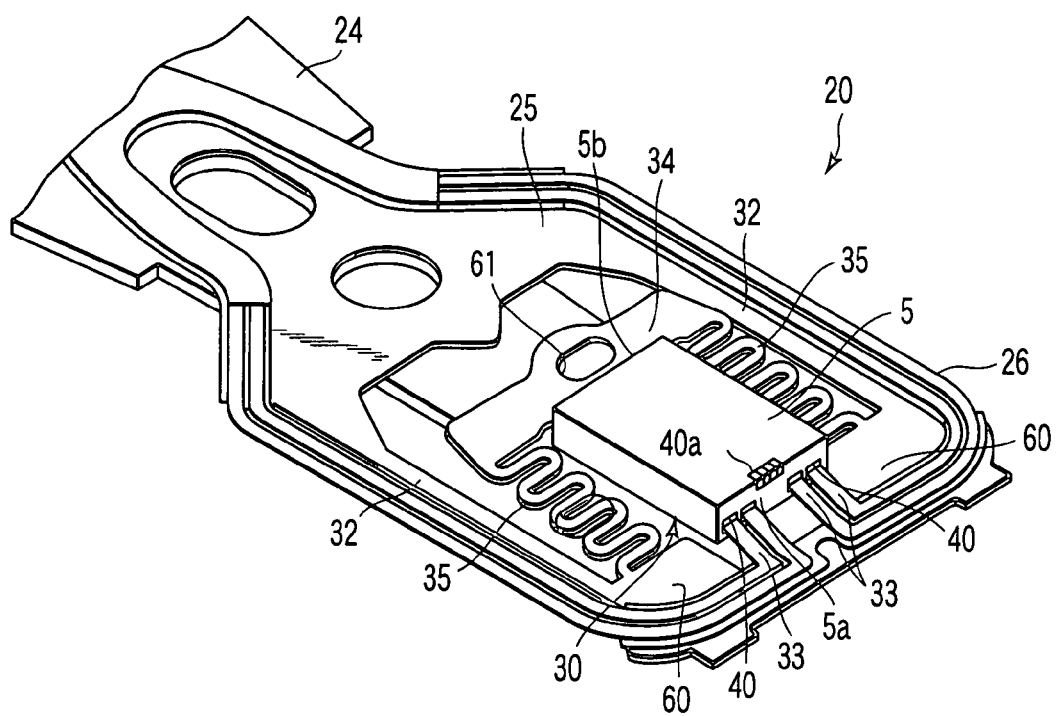
FIG. 2 is a perspective view enlargedly showing a distal end portion of the slider supporting apparatus shown in FIG. 1.
Figure 3:
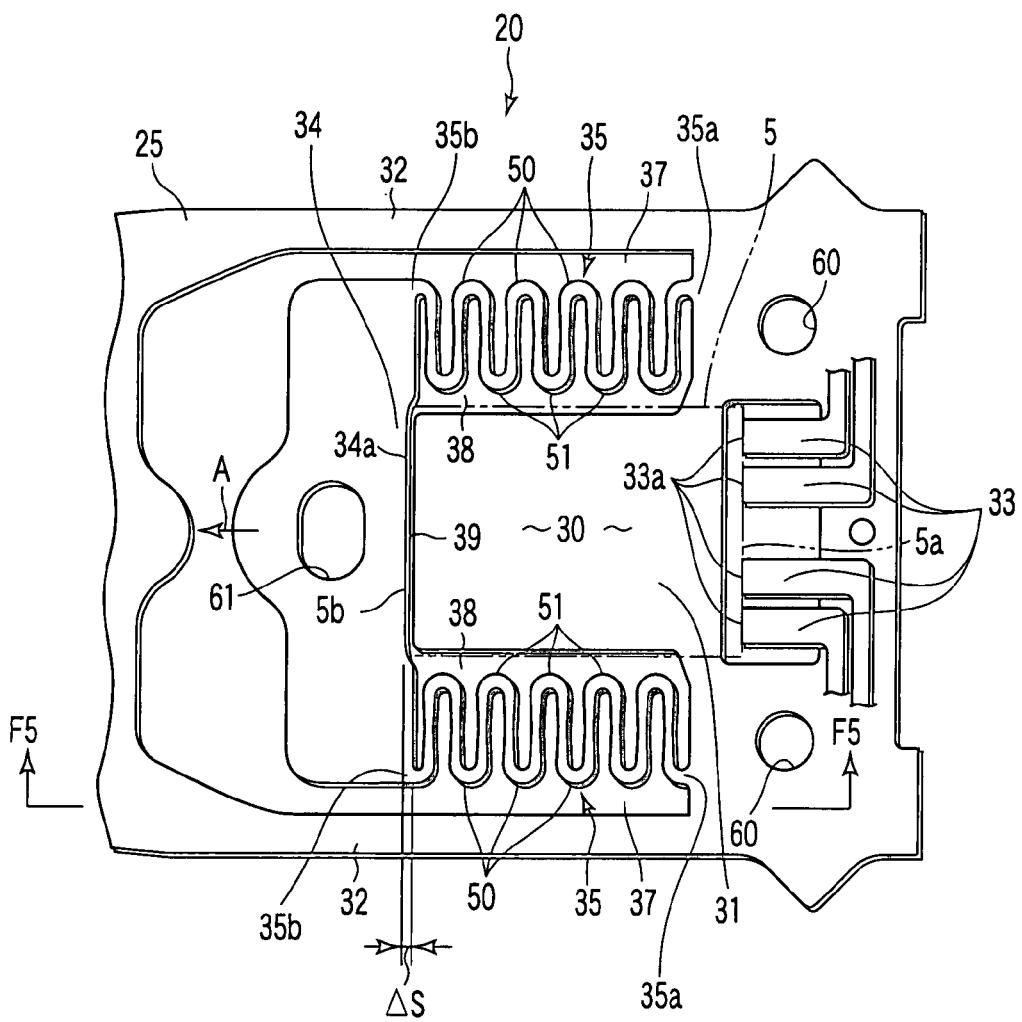
FIG. 3 is a plan view of a gimbals portion of the slider supporting apparatus shown in FIG. 1.

As shown in FIGS. 2 and 3, a gimbals portion 30 is formed on a distal end portion of the flexure 25. The gimbals portion 30 has a tongue 31 to be mounted with the slider 5, a pair of outrigger portions 32, first support portions 33, a second support portion 34, a spring portion formed of a pair of flat springs 35, left and right, etc. The outrigger portions 32 are formed individually along the opposite sides, left and right, of the tongue 31. The first support portions 33 are provided on the front part of the gimbals portion 30. The second support portion 34 is formed on the rear part of the gimbals portion 30. The tongue 31, outrigger portions 32, second support portion 34, and flat springs 35 are equal in thickness.

Figure 5:
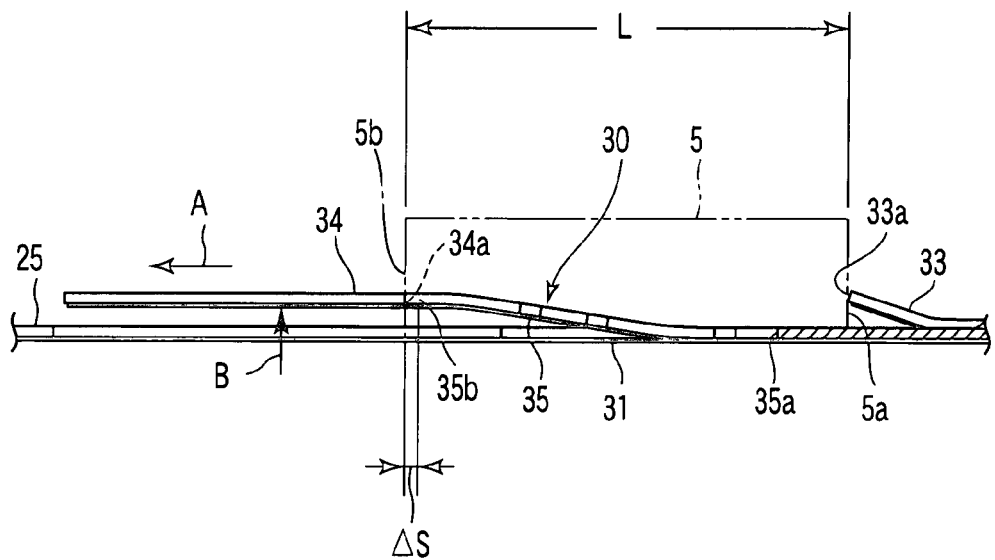
FIG. 5 is a partial sectional view of a flexure taken along line F5-F5 of FIG. 3.

As shown in FIG. 5, the first support portions 33 are composed of the respective distal end portions of a plurality of conductors or copper plates that constitute a part of the conductive circuit portion 26. The first support portions 33 are formed individually obliquely. The conductive circuit portion 26 has read conductors, write conductors, and an insulating layer formed of an electrical insulating material such as polyimide. At the distal end portions of the conductive circuit portion 26 that function as the first support portions 33, the insulating layer is removed so that only the conductors are exposed.

First slits 37 are formed individually between the outrigger portions 32 and the flat springs 35 by etching. Second slits 38 are formed between the tongue 31 and the flat springs 35 by etching. A third slit 39 is formed between the tongue 31 and the second support portion 34 by etching.

The first support portions 33 support one longitudinal end 5a of the slider 5 that is placed on the tongue 31. The second support portion 34 is formed so as to face the first support portions 33. The second support portion 34 can move relatively to the first support portions 33 in the longitudinal direction of the slider 5. The second support portion 34 has a function to support the other end 5b of the slider 5.

A read/write element 40a (FIG. 2), such as a magnetoelectric transducer, is provided on the distal end of the slider 5. Terminal areas 40 for electrical connection to the element 40a are provided on the end 5a of the slider 5. The respective distal end portions of the conductors of the conductive circuit portion 26 are in contact with the terminal areas 40 with the slider 5 held between the support portions 33 and 34. The distal end portions of the conductors function as the first support portions 33. When the conductors touch the terminal areas 40, the conductive circuit portion 26 and the slider 5 are electrically connected to each other, and the one end 5a of the slider 5 is supported.

As shown in FIG. 3, the pair of flat springs 35 constitute the spring portion. Each flat spring 35 has a plurality of U-shaped convexes 50 and inverted U-shaped concaves 51. The convexes 50 and the concaves 51 are alternately formed in the front-back direction of the gimbals portion 30 along the surface direction of the flexure 25. The extremity of each convex 50 extends toward its corresponding outrigger portion 32, and the extremity of each concave 51 toward the tongue 31.

Figure 4:
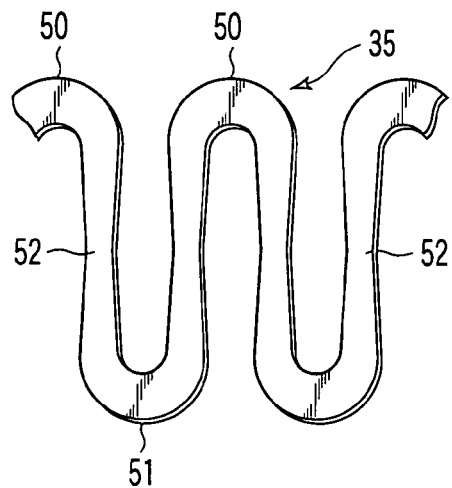
FIG. 4 is a plan view enlargedly showing a part of a flat spring of the gimbals portion shown in FIG. 3.

FIG. 4 is a plan view enlargedly showing a part of one of the flat springs 35. A portion between each convex 50 and its adjacent concave 51 of the flat spring 35 is shaped so that its middle part 52 is narrowest and its width gradually increases toward the respective extremities of the convex 50 and the concave 51. The thickness of the flat spring 35, including the convexes 50, concaves 51, and middle parts 52, is fixed.

In each flat spring 35 of this embodiment with its middle parts 52 constricted, stresses that are generated in various parts of the spring 35 when the spring 35 is stretched in the direction of arrow A in FIG. 3 can be equalized. Thus, the spring constant can be lowered, so that the extension stroke of the flat spring 35 can be lengthened.

The tongue 31, outrigger portions 32, second support portion 34, and flat springs 35 constitute a part of the flexure 25. Specifically, the respective contours of the tongue 31, outrigger portions 32, flat springs 35, second support portion 34, etc., are defined by the slits 37, 38 and 39 that are formed by etching a metal plate that constitutes the flexure 25. Thus, even the flat springs 35 of the complicated tapered shape can be accurately molded by photo-etching. Holes 60 and 61, which will be mentioned later, are also formed by etching.

As shown in FIG. 3, each flat spring 35 has a first end 35a and a second end 35b, which are located near the first support portions 33 and the second support portion 34, respectively. The first end 35a is situated nearer to the second support portion 34 than the one end 5a of the slider 5 is. The second end 35b is situated nearer to the first support portion 33 than the other end 5b of the slider 5 is. The second end 35b is situated nearer to the first support portions 33 by ΔS than a distal end 34a of the second support portion 34 is. Thus, the flat spring 35 is located between the opposite ends 5a and 5b of the slider 5.

When the slider 5 is held between the support portions 33 and 34, therefore, a tensile force continually acts between the second end 35b of the flat spring 35 and the distal end 34a of the second support portion 34. Thus, no compressive force acts between the second end 35b and the end 5b of the slider 5. In other words, no force to bring down the second support portion 34 acts between the second end 35b and the end 5b of the slider 5. Accordingly, the slider 5 is clamped between the support portions 33 and 34, so that the second support portion 34 can be prevented from being brought down around the end 5b of the slider 5 toward the first support portions 33 when the flat spring 35 is stretched. Thus, the second support portion 34 can always be kept in a stable posture.

The fixed first end 35a of each flat spring 35 may be formed in the same position as (or flush with) the end 5a of the slider 5 with respect to the longitudinal direction. Alternatively, the first end 35a may be formed ahead of the end 5a of the slider 5 (or toward the distal end of the flexure).

Figure 10:
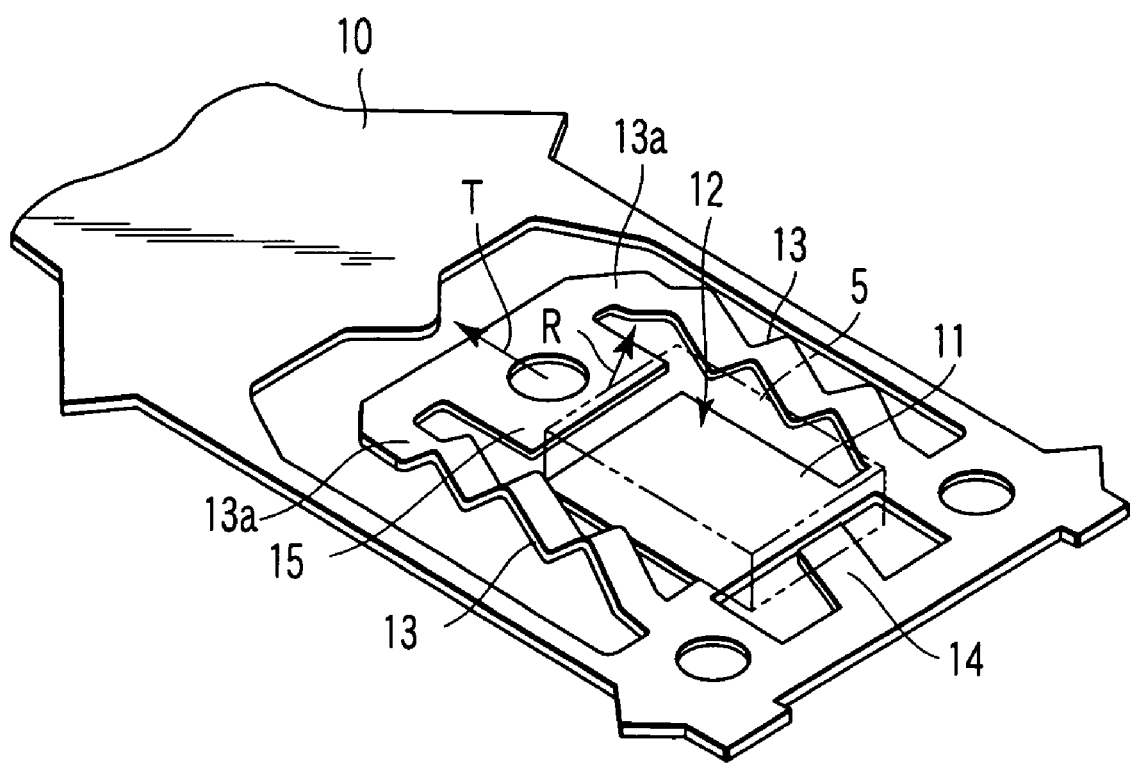
FIG. 10 is a partial perspective view of a conventional slider supporting apparatus having bellows portions.

In the conventional slider supporting apparatus shown in FIG. 10, an end 13a of each bellows portion 13 is situated apart from an end of the slider 5 in the direction of arrow T. In this conventional apparatus, therefore, a tension produced by the bellows portions 13 acts in the direction to compress the second support portion 15 toward the first support portion 14 with the slider 5 clamped between the support portions 14 and 15. Accordingly, the second support portion 15 is easily brought down around the end of the slider 5 toward the first support portion 14. Thus, the conventional slider supporting apparatus has a problem that the posture of the second support portion 15 is unstable.

In the present embodiment, as mentioned before, on the other hand, the movable second end 35b of each flat spring 35 is situated nearer to the first support portions 33 by ΔS than the end 5b of the slider 5 is, so that no force acts to bring down the second support portion 34. Thus, there is no possibility of the second support portion 34 being brought down around the end 5b of the slider 5 toward the first support portions 33, so that the second support portion 34 can always be kept in a stable posture.

A pair of first holes 60 are formed near the first support portions 33. A fixed jig for pulling the flat springs 35 can be inserted into the first holes 60. A second hole 61 is formed in the second support portion 34. A moving jig for pulling the flat springs 35 can be inserted into the second hole 61.

The flat springs 35 are stretched under an allowable stress such that the distance between the respective distal ends 33a and 34a of the support portions 33 and 34 is longer than a length L (FIG. 5) of the slider 5 when they are subjected to a tensile load in the direction of arrow A. When the flat springs 35 are in a free state such that it is not subjected to any tensile load, the distance between the distal ends 33a and 34a of the support portions 33 and 34 is lessened so that the slider 5 is held between the distal ends. Thus, the flat springs 35 have an extension stroke such that the slider 5 can be held between the support portions 33 and 34 within the range of the allowable stress or removed from between the support portions 33 and 34.

As shown in FIG. 5, the distal end portions of the conductive circuit portion 26 that serve as the first support portions 33 are formed so that the distal ends 33a face diagonally upward. The flexure 25 is supported by the jig that is inserted in the first holes 60. The flat springs 35 are stretched in the direction of arrow A by the jig that is inserted in the second hole 61. Further, the second support portion 34 is slightly moved (lifted) in the direction of arrow B, and the slider 5 is placed on the tongue 31 in this state.

If the flat springs 35 are released from the tension, thereafter, the slider 5 is clamped between the support portions 33 and 34. When the distal end portions of the conductive circuit portion 26 that serve as the first support portions 33 touch the terminal areas 40 in this state, the slider 5 and the conductive circuit portion 26 electrically connect with each other.

After the slider 5 is thus fixed on the tongue 31, a disc (not shown) of the slider tester is rotated. The slider 5 is examined in a manner such that it is caused to fly above the disc as the conductive circuit portion 26 is supplied with read/write current. Further, the slider 5 is also checked for flying characteristics and the like.

After the checks, the slider 5 is removed from between the support portions 33 and 34 by stretching the flat springs 35 again by means of the jigs. The slider 5 having been judged to be acceptable is mounted on an actual suspension. This suspension is incorporated into the disc drive. If any sliders are judged to be unacceptable, they are abandoned.

Since the flat springs 35 according to the present embodiment are formed by etching, the height of the convexes 50 and the depth of the concaves 51 along the surface direction of the flexure 25 can be made great enough. Besides, the convexes 50 and the concaves 51 can be increased in number. When compared with the conventional bellows portions 13 shown in FIG. 10, therefore, the spring constant of the spring portions can be lowered, so that the extension stroke can be made longer.

If the bellows portions 13 are designed so that the slider 5 cannot be lifted in the direction of arrow R when the bellows portions 13 are stretched, in the prior art example shown in FIG. 10, the spring constant inevitably becomes very high, e.g., as high as 700 gf/mm. Thus, the extension stroke of the bellows portions 13 in the prior art is as short as 0.025 mm, for example.

In the flat springs 35 of the present embodiment that are formed by etching, on the other hand, an example of the spring constant is about 120 gf/mm, which is low enough, so that the extension stroke can be made as long as about 0.08 mm, for example. According to the slider supporting apparatus 20 provided with the flat springs 35 constructed in this manner, the distance between the support portions 33 and 34 can be made long enough to avoid interference between the slider 5 and the support portions 33 and 34 as the slider 5 is placed onto the tongue 31. Thus, the slider 5 can be placed on the tongue 31 without any problem.

Further, the stiffness of the flat springs 35 of the present embodiment is low enough, e.g., as low as 1 gf/mm when the second support portion 34 is lifted in the direction of arrow B in FIG. 5. If the slider 5 is held between the support portions 33 and 34 by lifting the second support portion 34 for about 0.1 mm in the direction of arrow B, therefore, no substantial moment is generated that causes the slider 5 to tilt in its pitch direction. Thus, the slider 5 can be checked under pitch static attitude (PSA) conditions that are equivalent to those for actual suspensions.

According to the embodiment described above, the distal end portions of the conductive circuit portion 26 constitute the first support portions 33. If the first support portions need not be electrically connected to the slider 5, however, the convex first support portions may be formed on a part of the flexure 25 so that the one end 5a of the slider 5 can be supported by their respective distal ends. The first support portions may be formed by etching a part of the flexure 25.

Figure 6:
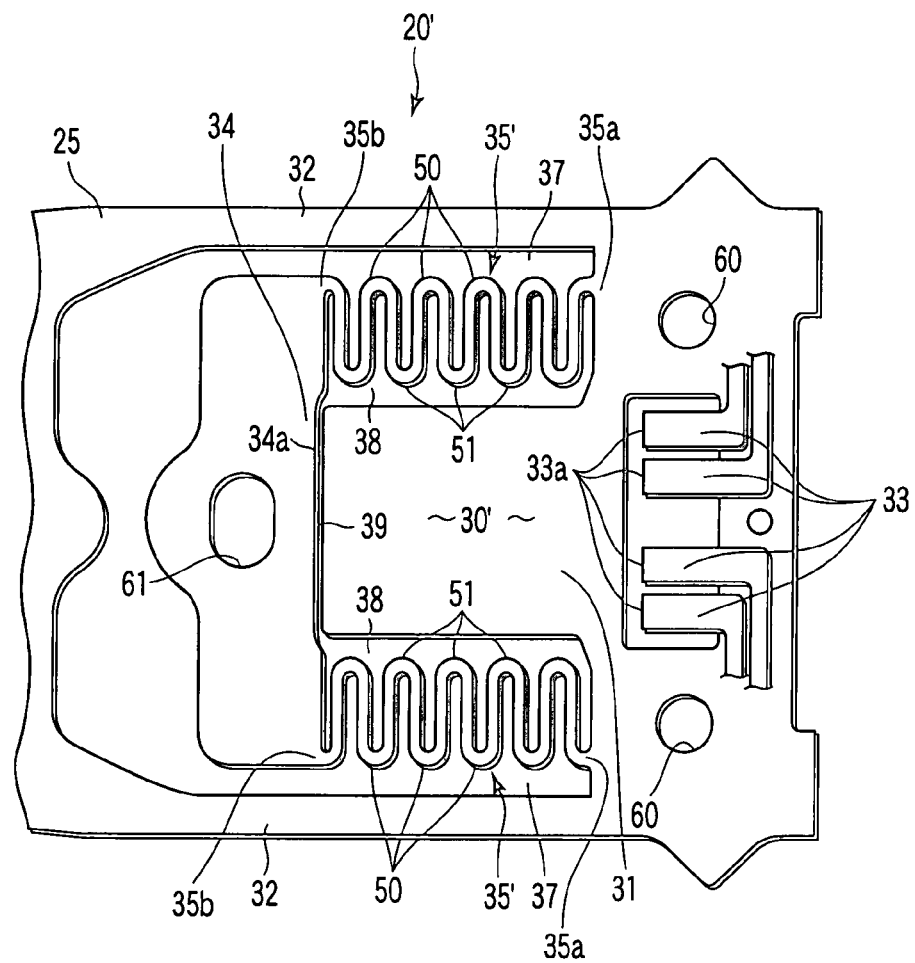
FIG. 6 is a plan view of a gimbals portion of a slider supporting apparatus according to a second embodiment of the invention.
Figure 7:
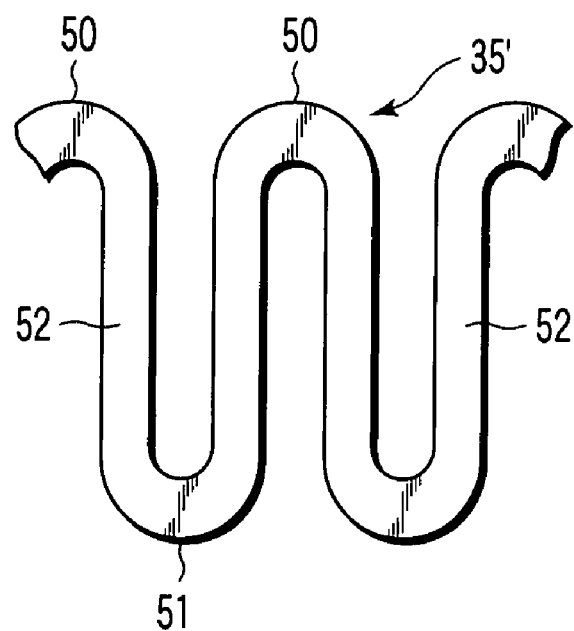
FIG. 7 is a plan view enlargedly showing a part of a flat spring of the gimbals portion shown in FIG. 6.

FIGS. 6 and 7 show a gimbals portion 30' of a slider supporting apparatus 20' according to a second embodiment of the invention. In each of flat springs 35' of the second embodiment, as shown in FIG. 7, a middle part 52 between each convex 50 and its adjacent concave 51 has a straight shape. Thus, the respective extremities of the convex 50 and the concave 51 are subjected to a high stress, and the middle part 52 to a lower stress.

The flat springs 35' of the second embodiment, compared with the flat springs 35 of the first embodiment, have a little higher spring constant, and hence, a correspondingly shorter extension stroke. For example, the flat springs 35' have a spring constant of 138 gf/mm. The flat springs 35' of the second embodiment has a spring constant lower enough than that of the bellows portions 13 shown in FIG. 10, and its stroke is several times or more longer. For example, the flat springs 35' have a stroke of 0.072 mm. Thus, the flat springs 35' of the second embodiment also meet the object of the invention. Since the flat springs 35 and 35' of the first and second embodiments share other configurations, common numerals are used to designate common portions, and a description thereof is omitted.

Figure 8:
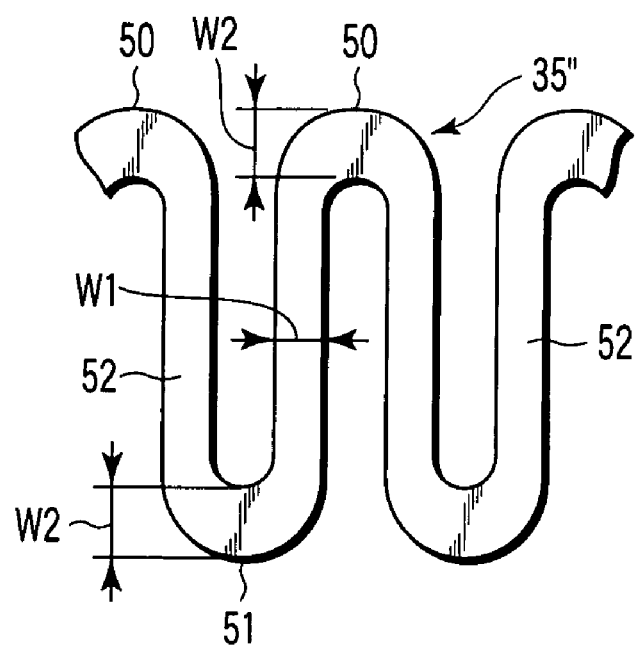
FIG. 8 is a plan view enlargedly showing a part of a flat spring of the gimbals portion according to a third embodiment of the invention.

FIG. 8 shows a part of a flat spring 35" according to a third embodiment of the invention. This flat spring 35" has a middle part 52 with a fixed width between each convex 50 and its adjacent concave 51. A width W2 of the respective extremities of the convex 50 and the concave 51 is larger than a width W1 of the middle part 52. For example, the widths W1 and W2 are 0.04 mm and 0.06 mm, respectively. In the case of the flat spring 35" shaped in this manner, stresses that are generated in various parts of the spring 35" can be equalized more efficiently than in the case of the flat spring 35' of the second embodiment. Therefore, the spring constant of the flat spring 35" can be lowered to increase the extension stroke. Since the flat springs 35' and 35" of the second and third embodiments share other configurations, common numerals are used to designate common portions, and a description thereof is omitted.

It is to be understood, in carrying out this invention including the embodiments described herein, that the components of the slider supporting apparatus, such as the configurations of the flexure, gimbals portion, spring portion formed of the flat springs, first and second support portions, etc., may be variously modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A slider supporting apparatus comprising a flexure formed of a metal plate having spring characteristics, the flexure comprising:

a gimbals portion including a tongue on which a slider is mountable;

a first support portion which supports a first longitudinal end of the slider placed on the tongue;

a second support portion which is movable with respect to the first support portion in a longitudinal direction of the slider and which supports a second longitudinal end of the slider; and a spring portion which urges the second support portion toward the first support portion, the spring portion comprising a pair of flat springs provided on opposite sides of the tongue, each of the flat springs including a plurality of convexes and concaves alternately formed along the tongue along a surface direction of the flexure, wherein the concaves extend toward the tongue along the surface direction, and the convexes extend away from the tongue along the surface direction;

wherein the spring portion is configured to extend to a length which allows the slider to be inserted between the first and second support portions when subjected to a tensile load, and to contract to a length such that the slider is held between the first and second support portions when subjected to no tensile load.

2. A slider supporting apparatus according to claim 1, wherein each of the flat springs is shaped such that a middle part between each convex and each corresponding concave is narrow and such that a width thereof increases from the middle part toward respective extremities of the convex and the concave.

3. A slider supporting apparatus according to claim 2, wherein each of the flat springs comprises a first end located near the first support portion and a second end located near the second support portion, the second end of each of the flat springs being situated nearer to the first support portion than the second end of the slider is.

4. A slider supporting apparatus according to claim 1, wherein each of the flat springs comprises a middle part having a fixed width between each convex and each corresponding concave such that widths of respective extremities of the convex and the concave are greater than the width of the middle part.

5. A slider supporting apparatus according to claim 4, wherein each of the flat springs comprises a first end located near the first support portion and a second end located near the second support portion, the second end of each of the flat springs being situated nearer to the first support portion than the second end of the slider is.

6. A slider supporting apparatus according to claim 1, wherein the flexure further comprises:

a pair of outrigger portions formed along the flat springs on opposite side portions of the flexure;

first slits formed between the flat springs and the outrigger portions by etching;

second slits formed between the flat springs and the tongue by etching; and a third slit formed between the tongue and the second support portion.

7. A slider supporting apparatus according to claim 6, wherein each of the flat springs comprises a first end located near the first support portion and a second end located near the second support portion, the second end of each of the flat springs being situated nearer to the first support portion than the second end of the slider is.

8. A slider supporting apparatus according to claim 1, wherein the flexure is provided with a conductive circuit portion having a distal end portion which electrically connects with a terminal area of the slider when the slider is held between the first and second support portions, and the distal end portion serves as the first support portion.

9. A slider supporting apparatus according to claim 8, wherein each of the flat springs comprises a first end located near the first support portion and a second end located near the second support portion, the second end of each of the flat springs being situated nearer to the first support portion than the second end of the slider is.

10. A slider supporting apparatus according to claim 1, further comprising:

a base portion fixed to a tester for checking the slider; and a load beam mounted on the base portion for displacement in a thickness direction thereof by a hinge member having spring characteristics;

wherein the flexure is located overlapping the load beam and is provided with the gimbals portion at a distal end portion of the load beam.

11. A slider supporting apparatus according to claim 10, wherein each of the flat springs comprises a first end located near the first support portion and a second end located near the second support portion, the second end of each of the flat springs being situated nearer to the first support portion than the second end of the slider is.

12. A slider supporting apparatus according to claim 1, wherein each of the flat springs comprises a first end located near the first support portion and a second end located near the second support portion, the second end of each of the flat springs being situated nearer to the first support portion than the second end of the slider is.

13. A manufacturing method for manufacturing the slider supporting apparatus according to claim 1, comprising forming contours of the flat springs and the gimbals portion by etching the metal plate which constitutes the flexure.

14. A slider supporting apparatus comprising a flexure formed of a metal plate having spring characteristics, the flexure comprising:

a gimbals portion including a tongue on which a slider is mountable;

a first support portion which supports a first longitudinal end of the slider placed on the tongue;

a second support portion which is movable with respect to the first support portion in a longitudinal direction of the slider and which supports a second longitudinal end of the slider; and a spring portion which urges the second support portion toward the first support portion, the spring portion comprising a pair of flat springs provided on opposite sides of the tongue, each of the flat springs including a plurality of convexes and concaves alternately formed along the tongue along a surface direction of the flexure;

wherein the spring portion is configured to extend to a length which allows the slider to be inserted between the first and second support portions when subjected to a tensile load, and to contract to a length such that the slider is held between the first and second support portions when subjected to no tensile load; and wherein each of the flat springs is shaped such that a middle part between each convex and each corresponding concave is narrow and such that a width thereof increases from the middle part toward respective extremities of the convex and the concave.

15. A slider supporting apparatus according to claim 14, wherein each of the flat springs comprises a first end located near the first support portion and a second end located near the second support portion, the second end of each of the flat springs being situated nearer to the first support portion than the second end of the slider is.

16. A slider supporting apparatus comprising a flexure formed of a metal plate having spring characteristics, the flexure comprising:
- a gimbals portion including a tongue on which a slider is mountable;
- a first support portion which supports a first longitudinal end of the slider placed on the tongue;
- a second support portion which is movable with respect to the first support portion in a longitudinal direction of the slider and which supports a second longitudinal end of the slider; and
- a spring portion which urges the second support portion toward the first support portion, the spring portion comprising a pair of flat springs provided on opposite sides of the tongue, each of the flat springs including a plurality of convexes and concaves alternately formed along the tongue along a surface direction of the flexure;
- wherein the spring portion is configured to extend to a length which allows the slider to be inserted between the first and second support portions when subjected to a tensile load, and to contract to a length such that the slider is held between the first and second support portions when subjected to no tensile load; and
- wherein each of the flat springs comprises a middle part having a fixed width between each convex and each corresponding concave such that widths of respective extremities of the convex and the concave are greater than the width of the middle part.

17. A slider supporting apparatus according to claim 16, wherein each of the flat springs comprises a first end located near the first support portion and a second end located near the second support portion, the second end of each of the flat springs being situated nearer to the first support portion than the second end of the slider is.

* * * * *